United States Patent [19]

Tomayko, Jr. et al.

[11] Patent Number: 5,143,337
[45] Date of Patent: Sep. 1, 1992

[54] FOOD SERVER DEVICE

[76] Inventors: Max J. Tomayko, Jr., 130 Riverermont Ct., Cheswick, Pa. 15024; Robert A. Germain, 5126 Chestnut Hill Dr., Ashtabula, Ohio 44004

[21] Appl. No.: 529,143
[22] Filed: May 25, 1990
[51] Int. Cl.⁵ .............................................. A47G 29/02
[52] U.S. Cl. ............................. 248/311.2; 248/240.4; 248/291; 108/44
[58] Field of Search ...................... 248/311.2, 310, 240, 248/291, 293, 240.4; 108/26, 44, 46, 47, 152; 211/90, 150, 132

[56] References Cited

U.S. PATENT DOCUMENTS

| 1,937,994 | 12/1933 | Taylor | 108/26 |
| 3,421,458 | 1/1969 | Salkoff et al. | 211/150 X |
| 3,838,841 | 10/1974 | Cadman | 108/46 X |
| 4,037,896 | 7/1977 | Kennedy, Jr. et al. | 248/293 X |
| 4,088,081 | 5/1978 | D'Arca | 248/231.4 X |
| 4,762,258 | 8/1988 | Murphy | 108/44 X |
| 4,852,499 | 8/1989 | Ozols | 108/44 |
| 4,896,858 | 1/1990 | Sokolski et al. | 248/311.2 |

FOREIGN PATENT DOCUMENTS 481463  3/1938  United Kingdom ................ 248/240

Primary Examiner—Alvin C. Chin-Shue
Attorney, Agent, or Firm—Eugene E. Renz, Jr.

[57] ABSTRACT

A food serving device, comprising a frame and mounting means for detachably mounting said frame to a vertical surface, said device including a cup holder and a pivotably mounted tray operable between a horizontal in-use position and a vertical storage position.

7 Claims, 3 Drawing Sheets

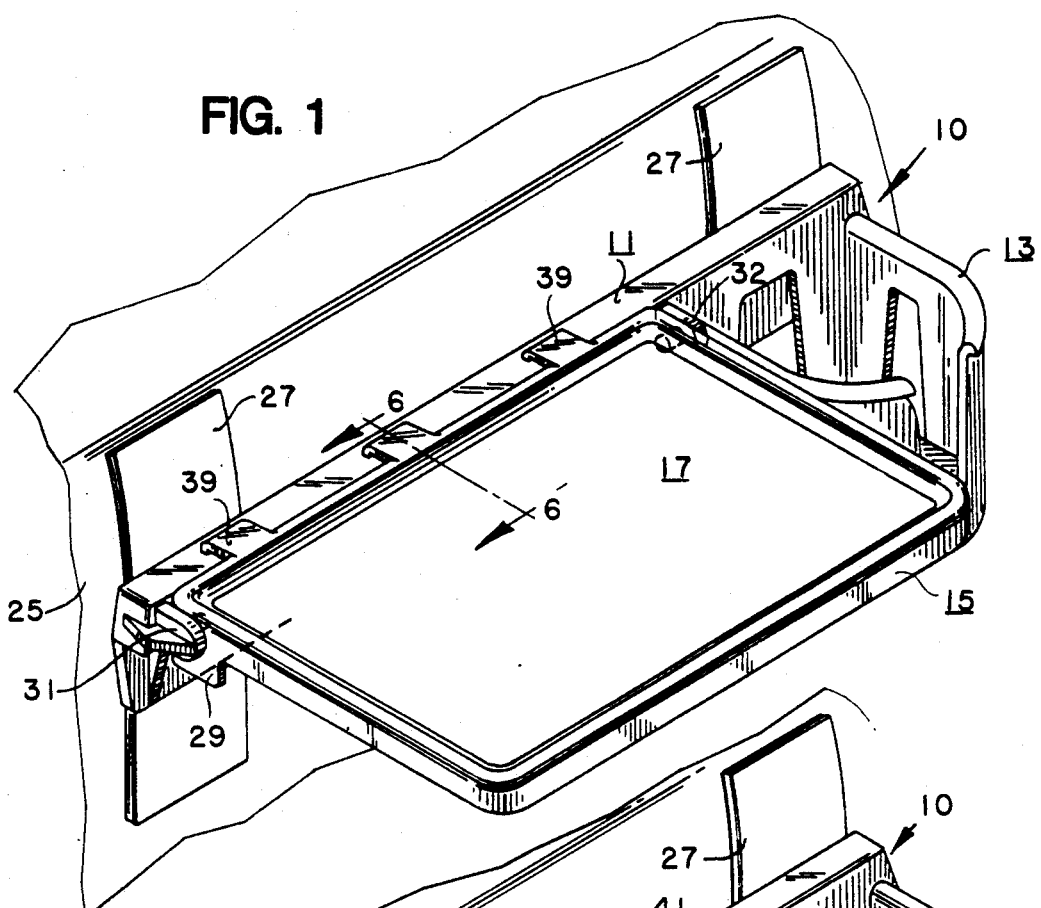
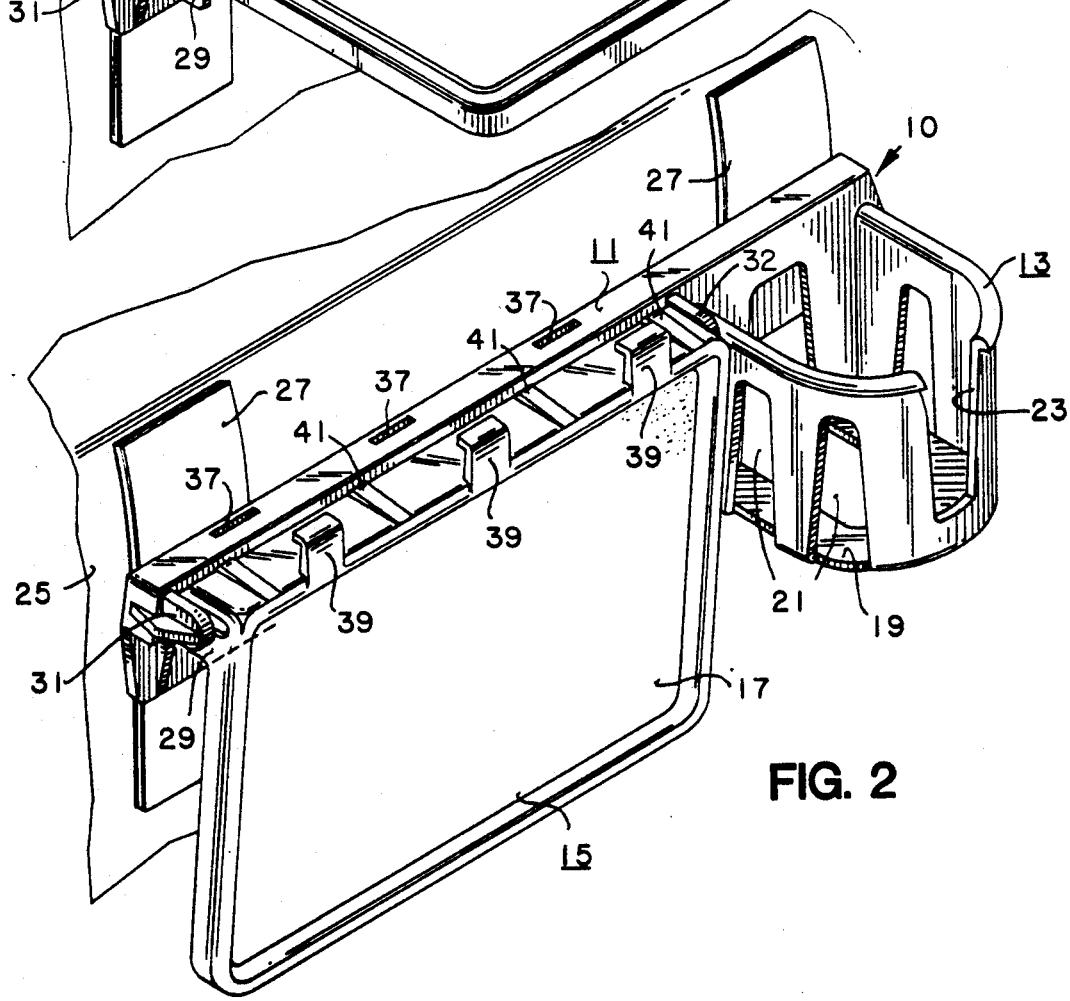

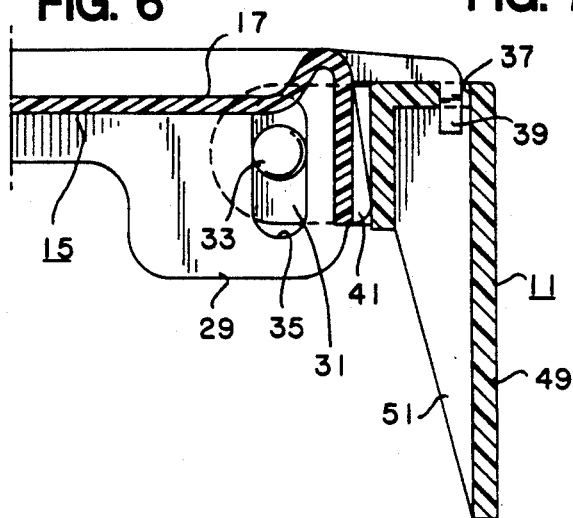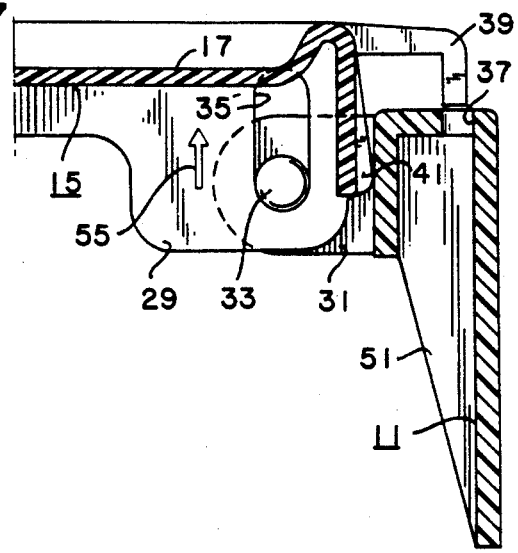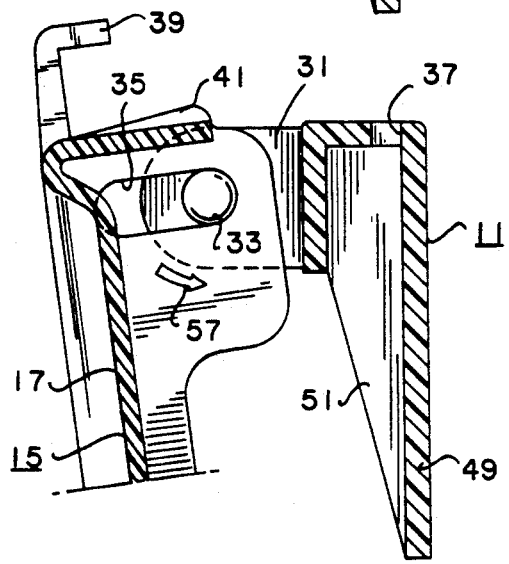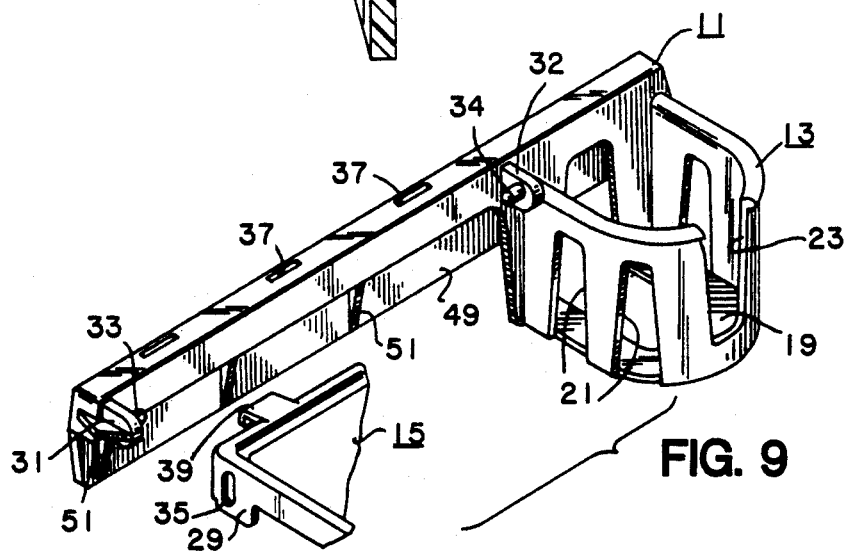

FOOD SERVER DEVICE

FIELD OF THE INVENTION

The present invention relates to stable, yet removable tray and cup holders for food and drink, in which the table folds against the vertical mounting surface when not in use.

BACKGROUND OF THE INVENTION

With the growth of fast food chains and drive-in windows, the number of meals eaten annually in the United States in the automobile has dramatically increased. At the same time, cars have become smaller and places to put food and/or drinks without spilling are seldom available.

It would be of great advantage if a stable yet removable tray and cup holder could be provided for a wide variety of applications. Specifically, automobile doors, glove compartment doors, the rear of the front seat, the dash and any vertical surface is a suitable candidate for the removable food serving device of the present invention. Similarly, boats, house trailers, travel trailers, work benches, card tables and office desks, drafting work stations, stadium and arena seatbacks and other places would be suitable candidates for such a food serving device if it existed.

As of the present time, no product exists which is suitable for detachably mounting to a vertical surface to provide a cup holder and a pivotably mounted tray which can be moved between an in-use position and a vertical storage position. It is an object of this invention to provide such a device.

SUMMARY OF THE INVENTION

It has now been discovered that the above and other objects of the present invention can be accomplished in the following manner. Specifically, a food serving device has been discovered which includes a frame and a mounting means for detachably mounting the frame to a vertical surface. The device further includes a cup holder and a pivotably mounted tray which is operable between the horizontal in-use position and the vertical storage position. The mounting means includes a plurality of vertical strips having an adhesive side facing the vertical surface. The adhesive strip is detachably mounted to the frame with hook and loop means.

In one embodiment, the pivotably mounted tray includes a pair of hinge pins on the frame and a cooperative slot means on the ends of the edge of tray which is adjacent to the frame. The slot means on the ends of the tray is positioned to accommodate the pins in both the in-use and the storage position.

In an additional embodiment, the device includes a top portion of the frame with slots located therein. The tray includes projecting hook means which are positioned to engage the slots to stabilize the tray when said tray is in the in-use position. The edge of the tray adjacent the frame can also include cam-like bumpers which are positioned to engage the frame when the table is in the in-use position to provide additional stability. Finally, the cup holder can include an open slot which is aligned for positioning the handle of a cup for convenient access.

BRIEF DESCRIPTION OF THE DRAWINGS

These and other objects of the present invention and the various features and details of the operation and construction thereof are hereinafter more fully set forth with reference to the accompanying drawings, where:

FIG. 1 is a perspective view of the preferred embodiment of the present invention, showing the device positioned on a vertical surface and in the in-use position.

FIG. 2 is a similar perspective view of the same embodiment shown in FIG. 1, with the table in the storage position.

FIG. 6 is a partially sectioned view taken along line 6—6 of the device shown in FIG. 4, while FIGS. 7 and 8 are similar views showing the movement of the tray from the in-use position to the storage position.

FIG. 9 is a perspective view showing the construction of the frame portion when the table portion has been removed from the device.

DETAILED DESCRIPTION OF THE PREFERRED EMBODIMENT

Figure 3:
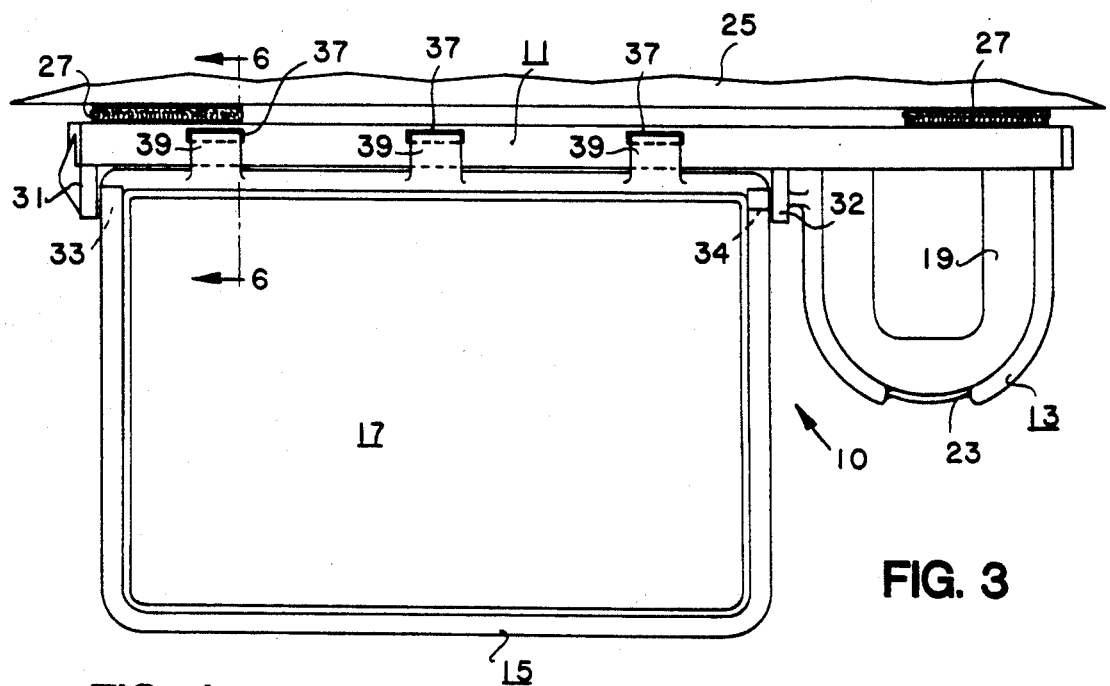
FIG. 3 is a top view of the device shown in FIG. 2, showing the means for attaching the device to the surface.
Figure 4:
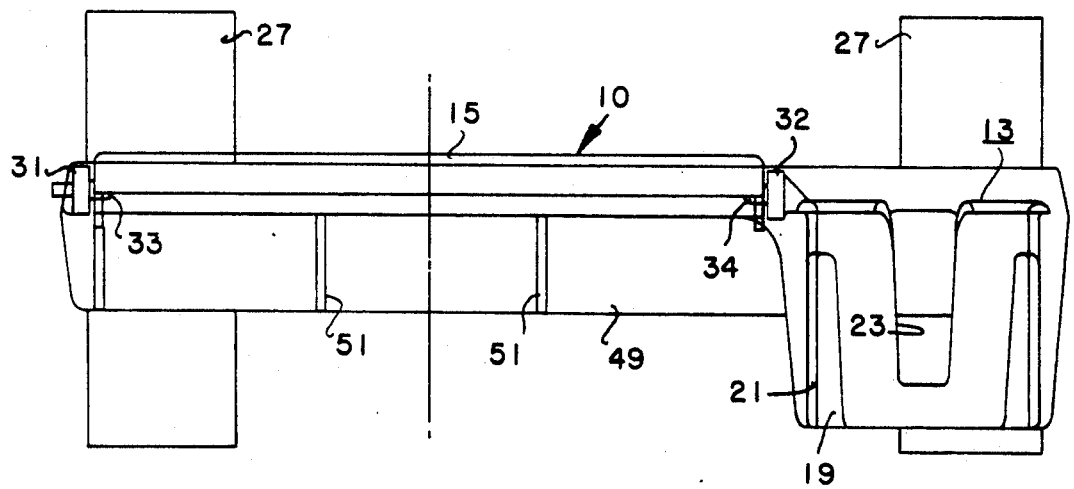
FIG. 4 is a front view of the device shown in FIG. 3.

As shown in FIG. 1, the device 10 is provided with a frame 11 and a cup holder 13. Also provided on the frame as described hereinafter a tray 15 which has a flat surface 17 to hold food or books, paperwork, maps or whatever is desired.

The cup holder 13 has a bottom surface 19 to support the cup and has a plurality of open slots 21. A cup handle slot 23 is provided for assisting in aligning in the handle of a coffee cup for easy access by the user.

The device itself is attached to any vertical surface 25, which may be flat or slightly curved as is encountered in the environment for which the device 10 is to be employed. The device is attached to the surface 25 by a plurality of mounting strips 27 as will be fully described below.

The tray 15 includes a pair of side portions 29 which are on the ends of the edge of the tray 15 which is adjacent the frame 11. Located on the frame 11 are hinges 31 and 32 and hinge pins 33 and 34. The pin 33 fits into a slot 35 on the side 29 of the frame 15 and, similarly, pin 34 fits into a similar side slot 53 on the other end of the tray 15. As will be described more completely below, the tray 15 is free to pivot about pivot pins 33 and 34 as long as the pins 33 and 34 are located in the slots 35 and 53 on the ends 29 of the table 15.

The frame 11 also includes a plurality of slots 37 along the top portion thereof. These slots 37 are designed to mate with a mating L-shaped hook projection 39 when the device is in the in-use position. As shown in FIG. 2, the mating L-shaped hook projections 39 are spaced from the slots 39 when the tray 15 is in the vertical or storage position.

Also located on the back of the tray 15 are a plurality of cam-like bumpers 41 which serve to stabilize the tray in the in-use position shown in FIG. 1.

Figure 5:
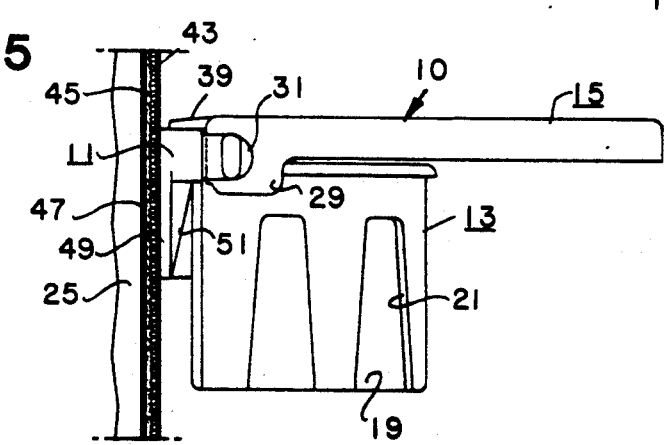
FIG. 5 is a view of the device shown in FIG. 3, taken from the left side of the device as shown therein.

The mounting strips 37 include a hook strip 43, as shown in FIGS. 3 and 5, which is attached to the strip 37 and the frame 11. The hook strip 43 cooperatively engages a loop strip 45 so that the two strips are fastened to one another by pressure. Of course, the hook strip 43 and loop strip 45 can be reversed if desired. As shown in FIGS. 3 and 5, the loop strip 45 has an adhesive backing 47 which, before installation, may be covered by a protective layer, not shown. When the layer is removed, the adhesive 47 is pressed in to the surface 25, such as the back of the front seat of an automobile, or any of the other surfaces described above. When the adhesive strip 47, containing the loop strip 45, is properly positioned on the vertical surface 25, the entire frame and tray and cup holder can be attached to the surface 25 by mating the loop strip 45 with the hook strip 43. When the device is attached using the hook and loop strip with the adhesive backing, the back of the frame 49 provides rigid support against the vertical surface 25 of the object to which the unit is attached. For further strengthening, the back of the frame 49 contains a plurality of structurally stabilizing struts 51.

As is shown in FIGS. 6, 7, and 8, the table 15 is in the in-use position with mating L-shaped hook projections 39 in slots 37. The cam-like bumper 41 functions to cause a tight and stable fit so that the table does not move substantially about pin 34. The pin 34 attached to the frame on hinges 32, supports the tray in slot 53.

As shown in FIG. 7, the table is moved in the in-use position shown in FIG. 6 by raising the table in the direction of arrow 55. The pin 34 slides to the bottom of slot 53 and the hook 39 disengages from slot 37. The table is then able to pivot about cam-like bumper 41, as shown in FIG. 8 in the direction of arrow 57 so that the table 15 assumes a vertical storage position, thereby taking up less room when the device is not in use, For the most part, the table will be stored in the vertical position shown in FIG. 2 when not in use. Of course, because of the detachability feature of the hook and loop strip combination 43 and 45, the entire frame 11 can be removed from the vertical surface 25 at any time and stored in the trunk or another convenient storage location. When the device is to be used, it is quickly attached to the hook and loop assembly 43 and 45 and the table 13 is raised to the in-use position shown in FIG. 1. Actuation of the hook and slot means 39 and 37, coupled with the cam-like bumper 41, provides a stable tray for use as desired.

While particular embodiments of the present invention have been illustrated and described herein, it is not intended to limit the invention and changes and modifications may be made therein within the scope of the following claims.

What is claimed is:

1. A food serving device adapted to be mounted on a support surface, comprising:

a frame and mounting means for detachably mounting said frame to said support surface;

a tray operable between a horizontal in-use position and a vertical storage position, said tray including a plurality of cam-like bumpers positioned to engage said frame when said tray is in said in-use position;

locking tabs on said tray vertically engageable in complementary locking slots in said frame in the in-use position;

means mounting said tray to said frame operable to permit pivoting and translation movement relative to said frame during movement of said tray between in-use and storage positions whereby when said tray is pivoted to an in-use position, the locking tabs engage in said slots by gravity to lock said tray in said in-use position; and said cam-like bumpers are vertically oriented when said tray is in said in-use position and taper upwardly with the thinnest portion of said cam-like bumpers being at the top when said tray is in said in-use position.

2. The device of claim 1, wherein said mounting means includes a plurality of vertical strips having an adhesive side facing said vertical surface.

3. The device of claim 2, wherein said adhesive strip is detachably mounted to said frame with hook and loop means.

4. The device of claim 1, wherein said pivotably mounted tray includes a pair of hinge pins on said frame and cooperative slot means on the ends of the edge of said tray adjacent said frame, said slot means being positioned to accommodate said pins in both the in-use and storage positions.

5. The device of claim 1, wherein said frame further includes a top portion having slots therein and said tray further includes projecting hook means positioned to engage said slots to stabilize said tray in said in-use position.

6. The device of claim 1, including a cup holder having an open slot aligned for positioning the handle of a cup for convenient access.

7. A food serving device as claimed in claim 1, wherein said locking tabs are of generally L-shaped configuration, each locking tab having a first leg extending rearwardly from the tray and a second leg extending generally transversely thereto, engagement of said locking tabs in said slots in the frame in said in-use position providing visual indicia to the user that the tray is in a locked position.

* * * * *